United States Patent [19]

Berchem

[11] Patent Number: 4,815,704

[45] Date of Patent: Mar. 28, 1989

[54] BALL VALVE

[75] Inventor: Rutger Berchem, Essen, Fed. Rep. of Germany

[73] Assignee: Metallpraecis Berchem & Schaberg Gesellschaft fur Metallformgebung m.b.H., Gelsenkirchen-Uckendorf, Fed. Rep. of Germany

[21] Appl. No.: 222,189

[22] Filed: Jul. 21, 1988

[30] Foreign Application Priority Data

Jul. 21, 1987 [DE] Fed. Rep. of Germany ....... 3724100

[51] Int. Cl.$^4$ ................................................ F16K 5/20
[52] U.S. Cl. .................................... 251/315; 251/171; 251/368
[58] Field of Search ............... 251/171, 174, 314, 315, 251/316, 317, 368; 137/375

[56] References Cited

U.S. PATENT DOCUMENTS

| 3,547,403 | 12/1970 | Grauer | 251/315 X |
| 3,592,440 | 7/1971 | McFarland | 251/315 X |
| 4,771,803 | 9/1988 | Berchem et al. | 251/316 X |

FOREIGN PATENT DOCUMENTS 8700106 5/1906 Fed. Rep. of Germany .

Primary Examiner—A. Michael Chambers
Assistant Examiner—John C. Fox
Attorney, Agent, or Firm—Herbert Dubno

[57] ABSTRACT

The ball valve according to my invention comprises a pressure-tight housing with at least one inlet-side and at least one outlet-side connecting pipe element, a valve ball made of sintered ceramic material, a valve seat and an operating shaft connected to the ball valve and guide through a shaft seal of the housing. The valve seat comprises seat rings which are clamped between the connecting pipe elements sealing the housing and are compressed on the valve ball. According to my invention the inlet-side seat ring placed on the inlet-side connecting pipe element is made of a flexible sealing material and the outlet-side seat ring put on the outlet-side connecting pipe element comprises a sintered ceramic ring which is inserted in the housing with a sealing element interposed and is resiliently supported on the outlet-side connecting pipe element.

6 Claims, 1 Drawing Sheet

BALL VALVE

CROSS REFERENCE TO RELATED APPLICATIONS

This application is related to the following commonly owned copending applications Ser. No. 07/101,187, now Pat. No. 4,771,803, filed 25 Sept. 1987; Ser. No. 07/128,819, filed 4 Dec. 1987 and Ser. No. 07/145,833, filed 20 Jan. 1988.

FIELD OF THE INVENTION

My present invention relates to ball valves and more particularly, to ball cocks using a sinter-ceramic ball to resist abrasive wear or deterioration.

My invention particularly involves a ball valve comprising a pressure-tight housing with at least one inlet-side connecting pipe element and at least one outlet-side connecting pipe element, a valve ball made of a sintered ceramic material, a valve seat and an operating shaft connected to the valve ball and guided through a shaft seal of the housing. The valve seat has an inlet-side seat ring and an outlet-side seat ring which are clamped between the connecting pipe elements in the housing and which are compressed elastically on the valve ball. My invention can be applied to valves with a single inlet-side connecting pipe element and a single outlet-side connecting pipe element as well as multipath valves with a plurality of connecting pipe elements.

BACKGROUND OF THE INVENTION

The ball valve described in German Utility Patent 87 00 106 has a valve seat made from identical sintered ceramic seat rings.

The combination of a sintered ceramic valve seat and a sintered ceramic valve ball is characterized by high wear resistance with good resistance to erosion, abrasion and cavitation as well as a good corrosion resistance. However the pressure seal of the valve is unsatisfactory.

Experience shows that a gastight valve of this specific type with a sintered ceramic valve seat and a sintered ceramic valve ball cannot be made and/or is not practical.

On the other hand a ball valve in a different form is known in practice in which the seat rings comprise flexible, especially elastically deformable material. Also here the valve seat comprises identically formed seat rings. However the known ball valve with a valve seat formed from an elastomer has an insufficiently long service life, especially in abrasive media and with overcritical expansion of the conveyed fluid.

OBJECTS OF THE INVENTION

It is an object of my invention to provide a ball valve which has a high resistance to erosion, cavitation and abrasion and is usable as a pressure-tight, especially a gastight, shutoff valve.

It is another object of my invention to provide an improved ball valve which combines satisfactory sealing properties sufficiently good enough to handle the flow of a pressurized gas without leakage and a long service life with good resistance to abrasion, cavitation and erosion.

SUMMARY OF THE INVENTION

These objects and others which will become more readily apparent hereinafter are attained in accordance with my invention in a ball valve comprising a pressure-tight housing with at least one inlet-side connecting pipe element and at least one outlet-side connecting pipe element, a valve ball made of a sintered ceramic material, a valve seat and an operating shaft connected to the valve ball and guided through a shaft seal of the housing.

According to my invention the inlet-side seat ring on the inlet-side connecting pipe element is made of a flexible sealing material and the outlet-side seat ring on the outlet-side connecting pipe element comprises a sintered ceramic ring which is fitted in the housing with a sealing element interposed between the ring and the housing and which is supported resiliently on the outlet-side connector pipe.

My invention is based on my discovery that in this ball valve most of the wear occurs on the outlet-side seat ring. Based therein, the key concept of my invention is that the inlet-side and the outlet-side seat rings should be made of different materials instead of the current identical materials which have been used heretofore.

My invention teaches particularly the combination of a sintered ceramic ball valve with an inlet-side seat ring made of a flexible sealing material and an outlet-side seat ring made of sintered ceramic material.

Surprisingly with this material combination according to my invention it is possible to make a ball valve which combines the good wear resistance of a sintered ceramic valve and the good sealing properties of an elastomerically sealed valve.

My invention is not limited to valves with a single entrance connecting pipe element and a single outlet connecting pipe element but also includes multipath valves. It is to be understood that in the case of multipath valves, e.g. three-way valves, on all inlet-side connecting pipe elements an inlet-side seat ring of flexible sealing material is provided and on all outlet-side connecting pipe elements an outlet-side sintered ceramic seat ring is provided.

The known elastomeric sealing materials are suitable for the inlet-side seat ring. These elastomeric materials include Buna rubber materials such as Perbunan, Viton, ethylene/propylene copolymer (EPDM), polyurethane and polytetrafluoroethylene. The design of the inlet-side seat ring should consider the elasticity of the material.

In an additional form of my invention the inlet-side seat ring is a rubber sealing ring which is self-sealing with the housing.

Another embodiment of my invention provides that the inlet-side seat ring is inserted in a seat ring casing which is compressed on the connecting pipe element and is sealed with a secondary seal in the housing. This embodiment is especially desirable when the inlet-side seat ring comprises a polytetrafluoroethylene (PTFE) or a high temperature-resistant gasket. This can be based on graphite with a supporting material, a mineral fibrous material with a supporting material, a layered metal braid or webbing if necessary with a supporting material.

The ball valve according to my invention combines a long service life, especially also under erosive and abrasive action, with a or particularly good seal. The ball valve according to my invention is usable as a gastight shutoff valve acting against both an underpressure and an overpressure.

With a suitable choice of materials for the inlet-side seat ring the ball valve according to my invention can be formed as a corrosion resistant and high temperature resistant valve. Surprisingly a reduction of the service life need not be feared when materials which have a reduced wear resistance are used for the inlet-side seat ring.

Brief Description of the Drawing

The above and other objects, features and advantages of my invention will become more readily apparent from the following description, reference being made to the accompanying highly diagrammatic drawing in which.

SPECIFIC DESCRIPTION

Figure 1:
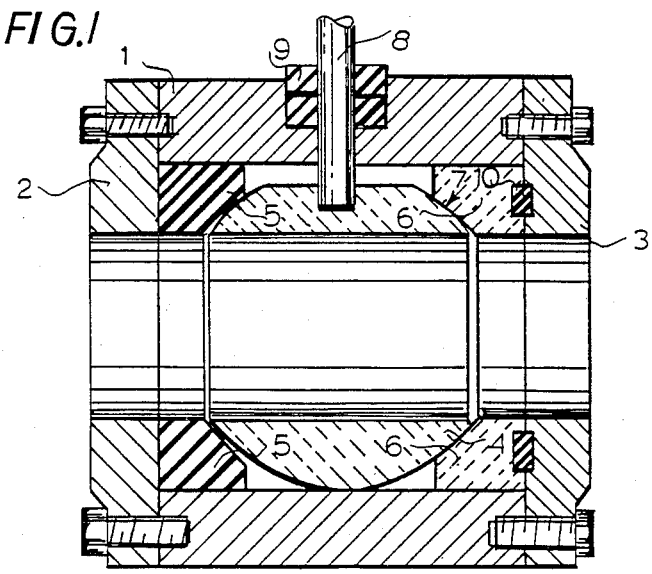
FIG. 1 is a longitudinal cross sectional view through an embodiment of a ball valve according to my invention.

A gaseous or fluid medium flows through the ball valve shown in the drawing in the direction indicated by the arrow. The ball valve basically comprises a pressure-tight housing 1 with an entrance end connecting pipe element 2 and an outlet end connecting pipe element 3, a valve ball 4 made of a sintered ceramic material, a valve seat 7 comprising seat rings 5, 6 and an operating shaft 8 for the valve ball 4 which is guided through a shaft seal 9 of the housing 1 and is connected to the valve ball 4. The seat rings 5, 6 are clamped in the housing 1 sealed between the connecting pipe elements 2, 3 and contact the valve ball 4 under elastic compression.

The inlet-side seat ring 5 mounted on the inlet-side connecting pipe element 2 is made from a flexible sealing material, e.g. from a polyurethane, a polytetrafluoroethylene, Viton or a similar material.

The outlet-side seat ring 6 mounted on the outlet-side connecting pipe element 3 is made in contrast from a sintered ceramic material and is shaped like a sintered ceramic ring which is put in the housing 1 with a sealing element 10 interposed and is pressed or braced resiliently on the outlet-side connecting pipe element 3.

In the embodiment shown in FIG. 1 the sealing element 10 is formed as an elastic element and thus is both a component which seals and acts like a spring or compressible member. The inlet-side seat ring 5 is a rubber sealing ring in this embodiment which is self-sealing on the housing 1.

Figure 2:
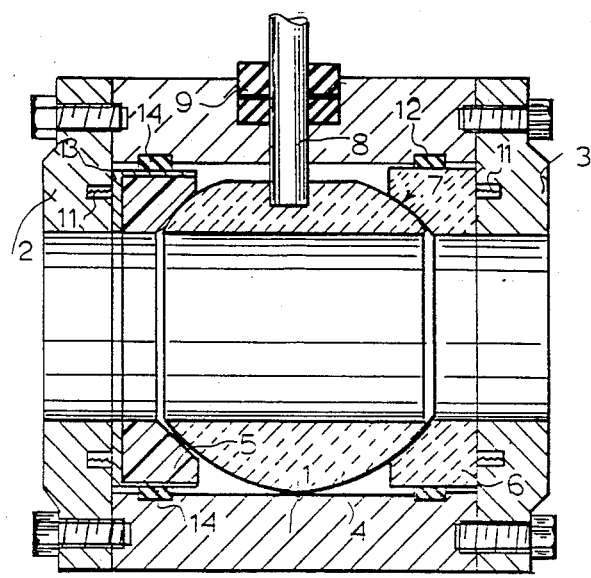
FIG. 2 is a longitudinal cross sectional view through another embodiment of a ball valve according to my invention.

In the embodiment shown in FIG. 2 the outlet-side seat ring 6 is pressed on a compressible spring 11 and is sealed on the outer peripheral surface with a yielding sealing member 12. The inlet-side seat ring 5 is inserted in a seat ring casing 13 which is compressed on the inlet-side connecting pipe element 2 and is sealed with a secondary sealing member 14 in the housing 1. This embodiment is then preferable when the inlet-side seat ring 5 is made of an only slightly flexible material. Thus the seat ring 5 can be particularly a polytetrafluoroethylene or a high temperature-resistant gasket.

In this second embodiment shown in FIG. 2 the sealing element mentioned in the following claims is essentially the sealing member 12.

We claim:

1. In a ball valve comprising a pressure-tight housing with at least one inlet-side connecting pipe element and at least one outlet-side connecting pipe element, a valve ball made of a sintered ceramic material, a valve seat, an operating shaft connected to said valve ball and guided through a shaft seal of said housing, said valve seat having an inlet-side seat ring and an outlet-side seat ring which are clamped between said connecting pipe elements in said housing and which are compressed elastically on said valve ball, the improvement wherein said inlet-side seat ring placed on said inlet-side connecting pipe element is made of a flexible sealing material and said outlet-side seat ring is on said outlet-side connecting pipe element and substantially comprises a sintered ceramic ring which is mounted in said housing with a sealing element interposed and is supported resiliently on said outlet-side connecting pipe element.

2. The improvement according to claim 1 wherein said inlet-side seat ring comprises a flexible rubber sealing ring which is self-sealing on said housing.

3. The improvement according to claim 1 wherein said inlet-side seat ring is inserted in a seat ring casing which is braced resiliently on said inlet-side connecting pipe element and which is sealed with a secondary sealing member on said housing.

4. The improvement according to claim 3 wherein said inlet-side seat ring comprises a polytetrafluoroethylene or a high temperature-resistant gasket.

5. A ball valve comprising:
a pressure-tight housing with at least one inlet-side connecting pipe element and at least one outlet-side connecting pipe element;
a valve ball made of a sintered ceramic material;
an operating shaft connected to said valve ball and guided through a shaft seal of said housing; and
a valve seat having an inlet-side seat ring made of a flexible rubber sealing material and an outlet-side seat ring comprising a sintered ceramic ring which are clamped between said connecting pipe elements in said housing and which are compressed elastically on said valve ball, said outlet-side seat ring being mounted in said housing with a sealing element interposed and pressed resiliently on said outlet-side connector pipe.

6. A ball valve comprising:
a pressure-tight housing with at least one inlet-side connecting pipe element and at least one outlet-side connecting pipe element;
a valve ball made of a sintered ceramic material;
an operating shaft connected to said valve ball and guided through a shaft seal of said housing; and
a valve seat having an inlet-side polytetrafluoroethylene seat ring inserted in a seat ring casing which is resiliently supported on said inlet-side connecting pipe element and which is sealed with a secondary sealing member in said housing and an outlet-side sintered ceramic seat ring placed on said outlet-side connecting pipe element which is put in said housing with a sealing element interposed and is pressed elastically on said outlet-side connector pipe.

* * * * *